(12) United States Patent
Kruesi et al.

(10) Patent No.: US 7,544,227 B2
(45) Date of Patent: Jun. 9, 2009

(54) MICROWAVE ENHANCEMENT OF THE SEGREGATION ROAST

(75) Inventors: Paul R. Kruesi, Golden, CO (US); Derek John Fray, Great Shelford (GB)

(73) Assignee: Cato Research Corporation, Golden, CO (US)

( * ) Notice: Subject to any disclaimer, the term of this patent is extended or adjusted under 35 U.S.C. 154(b) by 317 days.

(21) Appl. No.: 10/843,675

(22) Filed: May 10, 2004

(65) Prior Publication Data

US 2005/0103157 A1 May 19, 2005

Related U.S. Application Data

(60) Provisional application No. 60/469,544, filed on May 8, 2003.

(51) Int. Cl.
*C22B 9/22* (2006.01)
(52) U.S. Cl. ............... 75/10.13; 75/10.62; 75/10.63
(58) Field of Classification Search ............ 252/373; 75/10.13, 10.62
See application file for complete search history.

(56) References Cited

U.S. PATENT DOCUMENTS

| | | | | |
|---|---|---|---|---|
| 3,261,959 | A * | 7/1966 | Moe et al. | 219/700 |
| 4,311,520 | A * | 1/1982 | Kruesi et al. | 75/10.13 |
| 4,321,089 | A | 3/1982 | Kruesi et al. | |
| 4,324,582 | A | 4/1982 | Kruesi et al. | |
| 4,906,290 | A * | 3/1990 | Worner | 75/10.13 |
| 5,393,320 | A * | 2/1995 | Gomez | 75/10.67 |
| 5,698,759 | A | 12/1997 | Fray | |
| 5,906,671 | A * | 5/1999 | Weinwurm et al. | 75/479 |
| 5,972,302 | A | 10/1999 | Tranquilla et al. | |
| 6,277,168 | B1 * | 8/2001 | Huang et al. | 75/10.13 |
| 6,387,494 | B1 * | 5/2002 | Yanagida et al. | 428/402 |
| 2002/0189497 | A1 * | 12/2002 | Tranquilla | 106/405 |
| 2004/0060387 | A1 * | 4/2004 | Tanner-Jones | 75/10.2 |
| 2005/0025687 | A1 * | 2/2005 | Gomez | 423/85 |

OTHER PUBLICATIONS

Kirk-Othmer Encyclopedia of Chemical Technology, John Wiley & Sons, 2001, Hydrogen, vol. 13 pp. 773-784, publishe online Dec. 20, 2001.*
Recent Research in EAF Dust Processing, Pickles et al., Steel Mill Wastes and By-Products, Jun. 2-4, 1997.*
Rampacek et al.; "Treating Oxidized and Mixed Oxide-Sulfide Copper Ores by the Segregation Process" U.S. Bureau of Mines, Report of Investigations 5501; 1959; 28 pages.
Stanczyk et al.; "Copper Recovery from Segregation-Flotation Concentrates by Ammoniacal-Ammonium Carbonate Leaching"; U.S. Bureau of Mines, Report of Investigations 5826; 1961; 6 pages.
McKinney et al.; "Segregation of Copper Ores by Direct-Firing Methods"; U.S. Bureau of Mines, Report of Investigations 6215; 1963; 15 pages.

* cited by examiner

*Primary Examiner*—George Wyszomierski
*Assistant Examiner*—Tima M McGuthry-Banks
(74) *Attorney, Agent, or Firm*—Sheridan Ross P.C.

(57) ABSTRACT

Methods of enhancing the segregation roast through the use of microwave radiation and chloride ions are disclosed. The processes provide means of recovering metals trapped in ores and slags by reaction of these materials with carbon, chloride and water using microwave radiation as the primary energy source. The metals may be present in starting materials such as metallic sulfides, slags, metallic oxides such as laterites, magnetites, iron oxides, silicates and carbonates. The metals are reduced and can be recovered by separation from the gangue. Water, carbon and chloride can be recycled to the reaction to reduce costs.

30 Claims, No Drawings

US 7,544,227 B2

MICROWAVE ENHANCEMENT OF THE SEGREGATION ROAST

CROSS REFERENCE TO RELATED APPLICATION

This application claims priority to U.S. Provisional Patent Application Ser. No. 60/469,544, filed May 8, 2003, which is incorporated herein in its entirety by this reference.

FIELD OF THE INVENTION

The invention is in the field of the microwave and carbon assisted recovery of metals having volatile chlorides.

BACKGROUND OF THE INVENTION

In 1924 British Patent 250,991 first disclosed the segregation roast as a means to recover copper from unamenable oxide and silicate ores. Since that time, substantial technical efforts have been expended to make the process commercially viable. In the period from 1930 to 1970 a number of commercial operations used the process. The United States Bureau of Mines made extensive efforts to advance the process, and these efforts were reported in Reports of Investigations (RI5501; 1959; RI 5826, 1961; RI 6215, 1963) and resulted in a commercial operation in the United States. In the 1960's and 1970's attempts were made to extend the process to the recovery of nickel and cobalt from laterite deposits. An example of this is disclosed in Canadian Patent 48,377 of 1970.

While these efforts were a response to the demonstrated need to find a means of recovering metals from unamenable ores, the process is no longer in commercial use because it was proven to be very complex and energy intensive. The recovery of copper required an operating temperature of 750° C. to 800° C. and the recovery of nickel required an even higher temperature of 850° C. to 900° C.

As first developed, the reactions of the segregation roast utilized much less than stoichiometric amounts of chloride ion which was converted to hydrogen chloride gas that hydrochlorinated the desired metal oxides, silicates, or carbonates. The metal chlorides had sufficient volatility to migrate to carbon particles. Metal reduction associated with the carbon particles resulted in metal beads and the regeneration of the hydrogen chloride to hydrochlorinate additional metal oxide. The result was a "segregation" of the metal beads from the roasted gangue. The isolation of the metallic particles is then undertaken by means such as gravity separation, magnetic separation, electrostatic separation and even chemical separations specific to the desired metals.

Improvements to the segregation roast process have been directed to oxidic materials. At this time however, there is great concern about sulfides which are contained in mine or concentrator tailings. These tailings may originate from metal mining activity but may equally originate in coal mining activities. In metal mining and concentrating, pyrite (iron sulfide) is a frequent impurity. Its high iron and sulfur contents are unwanted in the smelter and so they are discarded along with substantial values in gold, silver, copper, zinc, nickel and cobalt that are often included in the waste and not recovered. Similarly, in order to meet required sulfur levels, coal is frequently processed to remove unwanted pyrite and ash formers. This results in "gob" piles that represent a loss of coal and an environmental hazard. Therefore, there is a need for a low cost and environmentally benign process to treat pyrite and other metal sulfide sources.

The segregation roast involves two interrelated reactions. One is the hydrochlorination of certain metal compounds which have sufficient volatility to migrate to nearby carbon surfaces. On the carbon surfaces, the second reaction occurs which is the reaction of water to reform the hydrogen chloride, with the carbon being oxidized and leaving the reaction site. The exact mechanism of the reaction has not been established but it has been postulated that water reacts with carbon in the well known "water gas" reaction to produce hydrogen which reduces the chloride to metal and regenerates the hydrogen chloride. The carbon monoxide of the water gas reaction may also play a role in reducing metal oxide formed by the hydrolysis of the metal chloride. This results in the carbon with metal chloride on it reacting to become a gas, and leaving behind a metal. The metal that remains is often, but not always, in hollow spheres which are holed where the gas escaped.

These reactions are attractive because they avoid the limiting factors in the direct reduction of metals below their melting points. That is, the tendency for the metal to form on the surface of the metal compound and thereafter limit the rate of metalization by the necessity for the reduction byproduct, water or carbon oxide to escape by a process of diffusion through the metal, which is necessarily a slow and energy expensive process. The segregation process, which has the metal-forming reaction occurring at a different site on the carbon particle than where the carbon oxidation reaction is occurring, avoids this difficulty.

Similarly, in the oxidation of sulfides, the reaction is hindered by the formation of sulfur on the sulfide mineral surface resulting in a diffusion-limited process below the boiling point of sulfur. Where oxygen is the oxidant, there is a strong tendency for the sulfur to burn above its boiling point and to form sulfur dioxide. Indeed, this is the standard product of sulfide roasting. As in the reduction reaction of the segregation roast, the use of much less than stoichiometric amounts of hydrogen chloride and the unique properties of microwave radiation permits the production of elemental sulfur and metal chlorides without the diffusion limitation.

U.S. Pat. Nos. 4,311,520 and 4,324,582 teach the use of microwave radiation as a means of selectively energizing copper, nickel and cobalt in their oxidic and sufidic compounds without substantially heating the gangue material present. The conversion of oxidic materials to chlorides is also shown. Neither patent discloses the use of carbon in the microwave for converting to metal, which is the essence of the segregation process.

U.S. Pat. No. 5,698,759 teaches that waste polyvinyl chloride can be an effective source of both chloride and energy at high temperatures. U.S. Pat. No. 5,972,302 shows that pyritic sulfides can be effectively converted to sulfur and metal oxides in the microwave. The beneficial role of carbon and chlorides is not recognized in this patent.

U.S. Pat. No. 4,906,290 teaches the use of carbothermic reduction in a microwave as a precursor to smelting. It teaches the facts of the particularly strong receptivity of carbon for microwave radiation and the high temperatures that can be attained. The patent cites heating pyrite to a temperature of releasing its labile sulfur and then carbothermically reducing iron oxide to carbon. The problem with the carbothermic iron process is that iron forms on the surface of the iron oxide particle after which time, a very slow process of diffusion of oxygen through the iron is required. In U.S. Pat. No. 4,906, 290 this problem is overcome by recourse to a second very high temperature melting furnace.

SUMMARY OF THE INVENTION

The methods of the present invention overcome these problems by using microwave radiation as the primary energy source in the presence of chloride ions, carbon and water. The carbon acts as receptor for the microwave energy as well as the active reductant. This microwave energy is then imparted to the desired reactions through the carbon that may reside at a temperature well in excess of the rest of the reaction products.

One embodiment of the present invention provides a method of reducing metals in metal-bearing ores or slags by exposing a metal-bearing ore such as metallic sulfides or metallic oxides to microwave radiation, carbon, chloride and water. The metallic oxides may include laterites, magnetites and iron oxides. Optionally, an oxidant may also be included with the carbon, chloride and water. This oxidant may be air, air diluted with nitrogen or sulfates. If sulfates are used, exemplary sulfates include ammonium sulfate, magnesium sulfate, zinc sulfate, sulfuric acid or combinations of these chemicals. The oxidant is preferably added to the reaction in an amount between about 110% to about 200% of the stoichiometric amount of the metal sulfides present in the ore. More preferably, the oxidant is added to the reaction in an amount between about 120% to about 150% of the stoichiometric amount of the metal sulfides present in the ore.

The carbon used in the reaction is added in an amount between about 5% and about 20% of the dry weight of the ore. More preferably, the carbon is present in an amount between about 10% and about 15% of the dry weight of the ore.

The chloride in the reaction may be supplied as ammonium chloride, polyvinyl chloride or hydrochloric acid. The chloride is preferably added in an amount of between about 5-fold to about 20-fold less than the stoichiometric amount of a metal in the metal-bearing ore.

In another embodiment of the invention, the reaction is conducted in two separate zones; the first zone providing microwave radiation that raises the temperature of the metal-bearing ore to a temperature between about 450° C. and about 600° C. and the second zone providing microwave radiation that raises the temperature of the metal-bearing ore to a temperature between about 700° C. and about 800° C. In this embodiment, the metal-bearing ore is held in the first zone for a time between about 30 minutes and about 90 minutes and metal-bearing ore is held in the second zone for about 10 minutes to about 20 minutes.

The microwave radiation source for these reactions is 915 megahertz or 2450 megahertz. The exposure to this radiation may be conducted in a microwave-transparent tube formed from a compound selected from the group consisting of alumina, aluminum silicate and quartz.

One use that the reactions of the present invention are particularly well suited to is the reduction of metals in metal sulfides. In these reactions, the sulfur produced may be condensed from the water and the chloride and these chemicals recycled to the reaction. In this embodiment, the metal-bearing ore may be heated to a temperature of about 450° C. in the presence of chloride and water and an oxidant prior to exposing the reactants to microwave radiation. Oxidants may also be used in this embodiment including air, air diluted with nitrogen or sulfates as described above. This additional heating step is preferably conducted between about 1 hour and about 2 hours.

In the reactions of the present invention, the metal-bearing ore may be ground to a size of less than about one-eighth of an inch in the longest dimension and blended with carbon used in the reactions prior to exposure to the microwave radiation to facilitate the reactions.

After the reduction reactions, the metals may be separated from the ore by any known means such gravity separation, magnetic separation, electrostatic separation or chemical separations. Additional carbon may also be recovered from the ore, preferably by flotation.

In another embodiment of the present invention, metal oxides are used in the reactions. The metal oxides are heated to temperatures between about 700° C. and about 800° C. by the radiation. This irradiation is typically conducted for about 10 minutes to about 20 minutes.

In another embodiment of the invention laterites are used in the reactions In this embodiment, the laterite is heated to a temperature of between about 700° C. and about 750° C. by the irradiating. This irradiation is typically conducted for about 10 minutes to about 20 minutes.

In another embodiment of the invention, the metal is nickel, cobalt or iron. In this embodiment, metal oxide is heated to a temperature of between about 700° C. and about 800° C. by the microwave irradiation. The irradiation is conducted for about 10 minutes and about 20 minutes.

Another embodiment of the present invention is hydrogen gas produced by exposing a metal-bearing ore such as metallic sulfides or metallic oxides to microwave radiation in the presence of carbon, chloride and water. With the use of metallic sulfides, the hydrogen gas may be produced by heating the metallic sulfides to a temperature of about 450° C. in the presence of chloride and water and an oxidant and exposing the metal-bearing ore to microwave radiation in the presence of carbon, chloride and water.

DETAILED DESCRIPTION OF THE INVENTION

The processes of the present invention provide a means of recovering metals trapped in ores by reaction of these ores with carbon, chloride and water using microwave radiation as the primary energy source. The metal-bearing materials may include metallic sulfides, slags, metallic oxides such as laterites, magnetites, iron oxides, silicates and carbonates. The metals may then be recovered by any of the known separation means such as gravity separation, magnetic separation, electrostatic separation and chemical separations. Excess or unreacted carbon may be recovered for re-use following the reaction by flotation of the carbon.

One embodiment of the present invention is the microwave-enhanced segregation roast of sulfidic materials to sulfur and metal. These reactions require an oxidant such as air, air diluted with nitrogen, or sulfates such as ammonium sulfate, magnesium sulfate, zinc sulfate or sulfuric acid. The amount of oxidant used is determined by the amount of sulfides in the feed. The required amount of oxidant is in the range of about 110% to about 200% of the stochiometric amount of the metal present in the ore sulfides. Preferably, the amount of oxidant is between about 120% and about 150% of the stochiometric amount of the sulfides present.

These reactions also require a minimum amount of carbon to reduce the metal that is to be recovered. While there may be several metals present in the non-metallic feed material, typically only one or more metals are targeted for segregation. In this case, the addition of reactants, including carbon and chloride ions, based upon the metal content of the feed material is calculated from the amount of the targeted metal present, as opposed to the amount of all metals present. More preferably, a substantial excess of carbon is used as an active reductant of the metals and also as a critical receptor for microwave radiation. This energy is then imparted to the desired reactions. After metal recovery, excess carbon is easily recaptured for reuse by flotation from the gangue. The minimum amount of carbon needed is about 5% of the dry weight of the feed. Preferably, the carbon used represents no greater than about 20% of the dry weight of the feed. More preferably, the carbon present in the reaction is between about 10% to about 15% of the weight of the feed. Preferably, the carbon used in the reaction is activated carbon or graphitic carbon sized less that about 8 mesh and coarser than about 20 mesh.

Chloride is added to the reactions of the present invention as ammonium chloride, polyvinyl chloride or as hydrochloric acid contained in the water of the reaction. The amount of chloride added to the reaction is determined by stoichiometry of the metal to be recovered divided by a factor between about 5 and about 20. This significant reduction reflects the fact that the chloride ion is used repetitively in the reactions.

In the metallic sulfide processing reactions of the present invention, it is desirable that there be two zones of microwave radiation. In the first zone, the feed material is exposed to sufficient microwave radiation to raise the temperature to between about 450° C. and about 600° C. That temperature is maintained for a period of between about 30 minutes to about 90 minutes to permit the removal of sulfur. The material then preferably passes to a second zone where more intense microwave radiation is used to raise the temperature of the mass to a range of between about 700° C. to about 800° C. The mass is held at this temperature for a time period of between about 10 minutes to about 20 minutes. Preferably, the mass is held at this elevated temperature for about 15 minutes. It should be noted that the individual carbon particles with their high receptivity for microwaves will be at substantially higher temperatures than the temperatures of the overall mass.

The preferred microwave source for these reactions is 915 megahertz or 2450 megahertz. Wave guides and microwave transparent windows can be used to isolate the microwave generator from the reaction vessel. Preferably, a vertical microwave-transparent tube of alumina, aluminum silicate, quartz or other refractory oxide is enclosed in stainless steel microwave containment equipment. The feed material is moved down the tube, counter-current to water vapor and chloride ion gases. It is desirable to remove sulfides from the hot zone. If two or more temperature zones are used, the removal of sulfides may take place in any or all of the different temperature zones. The sulfur is condensed before recycling the water vapor and chloride ion to the column to contact the incoming feed.

In this embodiment directed to the conversion of metallic sulfides to sulfur and metal, it is necessary to provide oxidation conditions that do not interfere with the subsequent reduction to metal. This is accomplished by the presence of excess carbon along with control of the amount and type of the oxidant. Chloride ion plays an important role in lowering the temperature at which the sulfide reacts, and in providing a reaction of the metal which is much less exothermic than would be that of the corresponding metal oxide. This is of importance in the processing of pyrite. Air, either alone or diluted with recycled nitrogen, is a suitable oxidant. Sulfate ions, in the form of either ammonium sulfate, magnesium sulfate, zinc sulfate or sulfuric acid are also suitable and serve the additional benefit of recovering any sulfur dioxide which may form in the reactor, recycling it to the production of sulfur.

In this embodiment of the present invention, a precursor step may optionally be used in which the amount of sulfide sulfur is reduced in a heated rotary reactor which uses the chloride and oxidant chemistry described above but at temperatures between about 350° C. and about 450° C.—the approximate point of ignition of sulfur in air. The optional use of this precursor step is dictated not by technical necessity but by the fact that microwave radiation is inefficiently generated from its original energy source and it is therefore desirable to minimize the microwave use in the segregation roast processes of the present invention to lower the overall energy expense of the process. Reaction times in this purely thermal reaction are longer than in the microwave-enhanced reaction and therefore, reaction times between about one hour and about two hours may be required, depending upon the sulfide content in the metallic sulfide feed materials.

In another embodiment of the present invention directed to the microwave-enhanced segregation roast of oxidic materials which have chlorides and at least some volatility at the reaction temperatures, the precursor sulfur removal and the use of two separate heating zones is not necessary. In this embodiment, the oxidic feed is ground to a workable size of less than about one-eighth inch in the longest dimension, blended with carbon and then fed to the column. The carbon serves as both a microwave radiation receiver and as the reductant. The microwave radiation is used to quickly bring the ground and blended feed to a temperature between about 700° C. and about 850° C. The feed descends into the hot reaction zone counter to a flow of gas containing steam and chloride ions. The feed remains at this temperature for a time period between about 10 minutes and about 20 minutes. The segregated metals are recovered from the discharged solids and, if warranted, excess carbon is recovered for recycle.

In another embodiment, the processes of the present invention may be used to recover nickel and cobalt from laterites. Laterites are low concentrations of metals in a matrix of magnesium silicates and/or iron oxides. In both instances, there is a necessity for excess carbon in the reaction to serve as a microwave receptor and reductant. The amount of carbon is dependent upon the concentration of the metals and the receptivity of the gangue. Sufficient chloride ion is provided to equal the stoichiometric content of the metals to be recovered, divided by a factor of about 5 to about 20 to account for the multiple use of the chlorides. In the recovery of nickel and cobalt, the co-reduction of a quantity of iron increases the recovered yield of the cobalt and nickel through alloy formation. This is controlled by varying the amount of chloride ion with respect to the iron present in the feed and is best determined by empirical testing for each laterite feed used. The reaction is conducted at a temperature of between about 700° C. to about 750° C. for a time of about 10 minutes to about 20 minutes.

In another embodiment of the present invention, the microwave-enhanced segregation roast is used in converting iron oxide, in either ferric oxide or magnetite form, to iron. In this embodiment of the present invention, the iron oxide source is ground to a size of less than about one-eighth inch in the longest dimension and blended with a quantity of carbon sufficient to both reduce the iron to metal and also to serve as the primary receptor of the microwave radiation. Preferably, the amount of carbon used is about 20% to about 40% of the stoichiometric amount of the iron present. In the case of magnetite, which is itself a good receptor, less carbon is required. The chloride ion works by the segregation method and thereby permits the reduction to occur in a very short time. The temperature of the mass is raised to between about 700° C. and about 850° C. The temperature is held for a time period of between about 10 minutes to about 20 minutes. A rapid and energy-efficient production of a non-pyrophoric iron results.

The following Examples are provided to illustrate embodiments of the present invention and are not intended to limit the scope of the invention as set forth in the claims.

EXAMPLES

Example 1

This Example illustrates the use of a precursor reaction to convert part of the sulfides present to oxides by reaction in a thermal reactor prior to reaction in a microwave reactor in order to minimize the use of microwave energy. It is not a segregation roast as no carbon was present.

Ninety Five grams of a dry pyrite containing flotation reject from a mining operation, analyzing 14.2% iron, 1.5% copper, 2% lead, 0.5% cobalt, 0.7% nickel and 17.2% sulfur, were reacted in an agitated stainless steel reactor with 84 grams of updraft air as oxidant. The reaction mass was heated from 360° C. to 425° C. over 68 minutes. Sulfur removal was estimated to be 90% with 24% of the sulfur recovered as sulfur dioxide. The dilute hydrochloric acid solubility of the metals was: copper 94%, nickel 69% lead 82%, cobalt 83%. Iron solubility was 5%. The low iron recovery shows that hematitie and magnetite are insoluble in dilute acid.

Example 2

This example illustrates a combined set of reactions in which the microwave segregation roast is preceded by a thermal process to lower the sulfur content. Following the segregation roast, the metallics were segregated by a magnetic separation.

Three hundred grams of the pyritic material of Example 1 was blended with 40 grams plus 10 mesh carbon, and reacted in a stainless steel rotary kiln. The reaction was conducted for 147 minutes at temperatures from 186° C. to 514° C. 300 grams of air saturated with water was added to the reaction with 20 grams of ammonium sulfate, and 50 milliliters of 36% hydrochloric acid. The amount of ammonium sulfate added represented the sulfur dioxide production that was anticipated and served as a useful sulfide oxidant. The product was transferred to a 2450 megahertz microwave reactor and processed for 42 minutes in a flow of 100 grams of air containing 45 milliliters of 36% hydrochloric acid. The microwave energy used was 1.5 kilowatt hours. During the microwave operation, the mass attained a bright red glow with white sparks noted on the carbon and metallics. The magnetic fraction which is soluble in dilute hydrochloric acid analyzed: iron 30% ,copper 46% lead 93% nickel 20% and cobalt 14%. The non-magnetic fraction analyzed: iron 12%, copper 10%, lead 44%, nickel 7% and cobalt 5%. The overall sulfur in the products was 46% of that in the feed.

Example 3

In this example, 200 grams of the pyritic reject of Example 1 and 100 grams of a chalcopyrite flotation tailing from the same mining operation were blended. The resultant feed assayed 17.4% iron, 10% copper, 1.6% nickel and 1.2% cobalt. This example illustrates that the total segregation roast can be accomplished in the microwave. Three hundred grams of the sulfidic feed was blended with 120 grams of ammonium sulfate, and 40 grams of plus 10 mesh carbon. During the reaction, 167 grams of water saturated air were added at a rate of three liters per minute. 60 milliliters of 36% hydrochloric acid was added in the air. Reaction time was 60 minutes with a post reaction (air input stopped) of 45 minutes. A total of 1.76 Kw hours of microwave energy was applied. Following the segregation roast, a magnetic separation was made with 35% of the material magnetic. In the magnetic fraction, the dilute acid solubilities were: iron 33%, copper 54%, nickel 11% cobalt 10%. The non-magnetic solubilities were: iron 26%, copper 14%, nickel 10% and cobalt 13%. Only 9.5% of the original sulfur reported as sulfide in the magnetic product while 37% of the original sulfur reported as sulfide in the non-magnetic fraction. Of the 29 grams of contained sulfur in the ammonium sulfate, only 1.4 grams was found in the magnetic product. 1.7 grms of sulfur as sulfur dioxide was found in the caustic exit scrubber.

Example 4

This example shows the effectiveness of the microwave enhanced segregation roast in recovering copper from a commercial copper furnace slag. The Maerz furnace slag assayed at 19.1% copper, 0.23% nickel, 18% iron oxide, 26.5% silica, 4.5% alumina and 10.7% calcium oxide. 25 grams of slag were ground to minus one-eighth inch and blended with 5 grams of ammonium chloride and 5 grams of carbon. A 2450 mega hertz microwave at 1 kilowatt was applied for ten minutes. The reaction mass was leached in a hydrochloric acid-acidified sodium chloride brine. The soluble yield of copper was 88% and nickel 55%.

Example 5

This example shows the effectiveness of the microwave-enhanced segregation roast in recovering nickel and cobalt from limonitic laterite deposits.

Two hundred grams of a California limonitic laterite containing 39% iron, 1% nickel and 0.07% cobalt were blended with 11.4 grams of waste polyvinyl chloride (representing 5.7 grams chlorine) and eleven grams of carbon in a vertical quartz reactor with a bottom porous quartz diffusion plate. The mass was subjected to 2450 mega hertz microwave radiation. It took 14 minutes to reach a high temperature and was held at temperature for 25 minutes. 0.43 Kw hours of microwave energy was used at temperature. The product mass was leached in dilute hyrdochloric acid. The solubilities were: iron 57%, nickel 90%, and cobalt 62%.

Example 6

This example shows that the microwave enhanced segregation roast is also effective in recovering nickel and cobalt from a saprolytic (high magnesium silicate) laterite. A four hundred gram sample of a saprolyte laterite from Columbia S. A. assaying: iron 10%, nickel 3% and cobalt 0.02% was blended with 21 grams (10.4 grams chlorine) of waste polyvinyl chloride and 12.4 grams carbon in a vertical quartz reactor described in Example 5. It took 15 minutes to reach reaction temperature which was held for 21 minutes. 0.4 Kwh of microwave energy was used during the holding period. The product was leached in dilute hydrochloric acid and the acid soluble fractions were: iron 73%, nickel 75%, and cobalt 18%.

Example 7

This example shows that the microwave enhanced segregation roast is a effective means for the direct reduction of iron from iron oxide.

Two preparatory runs were made in which 200 grams of iron oxide ($Fe_2O_3$) were blended with 20 grams (10 grams chlorine) of waste polyvinyl chloride and 17.5 grams of carbon. 100milliliters of water and 50 milliliters of 36% hydrochloric acid were passed over the feed material in an updraft with two to three liters nitrogen per minute during these runs. Each reaction time was 40 minutes and a total of 1.27 Kwhours of microwave energy was applied. At the end of the second run, 12 grams, or 8.5% of the iron present was iron metal. In a third run, the material from the first two runs was blended with an additional five grams of carbon. The material was subjected to 50 minutes of microwave energy with a an addition of 40 milliliters of 36% hydrochloric acid in 2 to 3 liter per minute of water-saturated nitrogen. 1.1Kwhours of microwave energy was applied. The magnetite and iron where separated from the residual silicate sand. 53.8 grams of iron metal was found which was 38% of the iron in the iron oxide feed.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of recovering metals in a metal-bearing material comprising:
   exposing a metal-bearing material selected from the group consisting of metallic sulfides, metallic oxides and slags, with carbon and water to microwave radiation to raise the temperature of the carbon to between about 700° C. and about 800° C., in the presence of a chloride source selected from the group consisting of ammonium chloride, polyvinyl chloride and hydrochloric acid to produce a solid metal; and,
   recovering the solid metal.

2. The method of claim 1, wherein the metallic oxides are selected from the group consisting of laterites, magnetites and iron oxides.

3. The method of claim 1, wherein the exposing is conducted in the presence of an oxidant.

4. The method of claim 3, wherein the oxidant is selected from the group consisting of air, air diluted with nitrogen, and sulfates.

5. The method of claim 4, wherein the sulfates are selected from the group consisting of ammonium sulfate, magnesium sulfate, zinc sulfate, sulfuric acid and combinations thereof.

6. The method of claim 3, wherein the oxidant is present in an amount between about 110% to about 200% of the stoichiometric amount of the metal sulfides present in the material.

7. The method of claim 3, wherein the oxidant is present in an amount between about 120% to about 150% of the stoichiometric amount of the metal sulfides present in the material.

8. The method of claim 1, wherein the carbon is present in an amount between about 5% and about 20% of the dry weight of the material.

9. The method of claim 1, wherein the carbon is present in an amount between about 10% and about 15% of the dry weight of the material.

10. The method of claim 1, wherein the chloride is present in an amount of between about 5-fold to about 20-fold less than the stoichiometric amount of a metal in the metal-bearing material.

11. The method of claim 1, wherein the exposing is conducted in two separate zones, wherein the first zone comprises microwave radiation sufficient to raise the temperature of the metal-bearing material to a temperature in the range of between about 450° C. and about 600° C. and the second zone comprises microwave radiation sufficient to raise the temperature of the metal-bearing material to a temperature between about 700° C. and about 800° C.

12. The method of claim 11, wherein the metal-bearing material is held in the first zone for a time period between about 30 minutes and about 90 minutes.

13. The method of claim 11, wherein the metal-bearing material is held in the second zone for a time period between about 10 minutes and about 20 minutes.

14. The method of claim 1, wherein the microwave radiation source is at least one of 915 megahertz and 2450 megahertz.

15. The method of claim 1, wherein the exposing is conducted in a microwave-transparent tube formed from a compound selected from the group consisting of alumina, aluminum silicate and quartz.

16. The method of claim 1, wherein the metal-bearing material is a metallic sulfide and the sulfur produced is condensed from the water and the chloride.

17. The method of claim 1, comprising the additional step of:
   heating the metal-bearing material to a temperature of about 450° C. in the presence of chloride and water and an oxidant prior to the exposing step.

18. The method of claim 17, wherein the oxidant is selected from the group consisting of air, air diluted with nitrogen, and sulfates.

19. The method of claim 17, wherein the heating step is conducted for a time period of between about 1 hour and about 2 hours.

20. The method of claim 1, comprising the additional steps of grinding the metal-bearing material to a size of less than about one-eighth of an inch in the longest dimension and blending the ground material with carbon prior to the exposing step.

21. The method of claim 1, wherein the recovering step comprises separation of metal particles from the material by a means selected from the group consisting of gravity separation, magnetic separation, electrostatic separation and chemical separation.

22. The method of claim 1, comprising the additional step of recovering carbon from the metal-bearing material by flotation.

23. A method of reducing metals in metal oxides comprising irradiating a metal oxide, carbon and water with microwave radiation to a temperature of between about 700° C. and about 800° C. in the presence of chloride.

24. The method of claim 23, wherein the irradiating is conducted for a time of between about 10 minutes and about 20 minutes.

25. A method of reducing metals in laterites comprising irradiating a laterite feed, carbon and water with microwave radiation to a temperature of between about 700° C. and about 750° C., in the presence of chloride.

26. The method of claim 25, wherein the irradiating is conducted for a time of between about 10 minutes and about 20 minutes.

27. The method of claim 25, wherein the metal is at least one of nickel and cobalt.

28. A method of reducing iron in iron oxides comprising irradiating an iron oxide, carbon and water with microwave radiation to a temperature of between about 700° C. and about 800° C., in the presence of chloride.

29. The method of claim 28, wherein the irradiating is conducted for a time of between about 10 minutes and about 20 minutes.

30. The method of claim 28, wherein the carbon is present in an amount between about 20% and about 40% of the stoichiometric amount of the iron present in the iron oxides.

* * * * *